OR 3,744,871

X 3049 W
X 3053 R

United States Patent [19]

Takeda et al.

[11] 3,744,871

[45] July 10, 1973

[54] HOLOGRAPHIC MEMORY SYSTEM FOR RECORDING DIGITAL INFORMATION

[75] Inventors: Yasutsugu Takeda, Kokubunji; Yoshitada Oshida, Nerima-ku, Tokyo, both of Japan

[73] Assignee: Hitachi, Ltd., Tokyo, Japan

[22] Filed: Feb. 25, 1971

[21] Appl. No.: 118,617

[30] Foreign Application Priority Data

Feb. 25, 1970 Japan ............................... 45/15558
Dec. 25, 1970 Japan ............................... 45/130688

[52] U.S. Cl. ............................ 350/3.5, 340/173 LT
[51] Int. Cl. ............................ G02b 27/00
[58] Field of Search ....................... 350/3.5, 162 SF; 340/173 LT

[56] References Cited

UNITED STATES PATENTS

| | | | |
|---|---|---|---|
| 3,530,442 | 9/1970 | Collier et al. | 350/3.5 |
| 3,623,786 | 11/1971 | Dammann | 350/3.5 |
| 3,604,778 | 9/1971 | Burckhardt | 350/3.5 |

*Primary Examiner*—Ronald L. Wibert
*Assistant Examiner*—Ronald J. Stern
*Attorney*—Craig & Antonelli

[57] ABSTRACT

A memory system wherein information is represented as Fourier transforms, which are in turn recorded on a recording medium such as a photographic film with a high packing density by a holographic process. Coherent light from a laser is introduced to a light modulator, which inlcudes a bit array representing the information. The phase of the light wave corresponding to each bit is shifted at random so as to smooth sharp variations in the light intensity distribution on the recording medium due to the interference between light waves diffracted by different bits. The abovementioned phase shift is performed either by using a random phase shifter or by using a random phase illumination hologram.

1 Claim, 8 Drawing Figures

FIG. 1 PRIOR ART
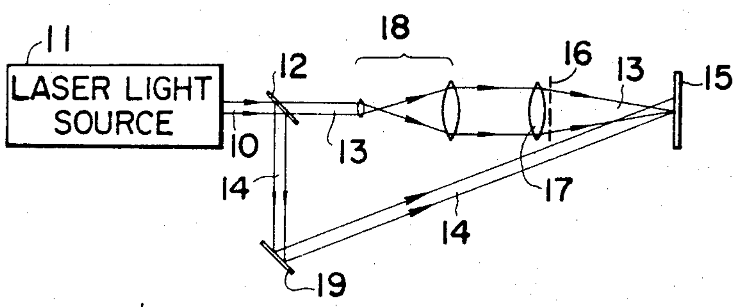
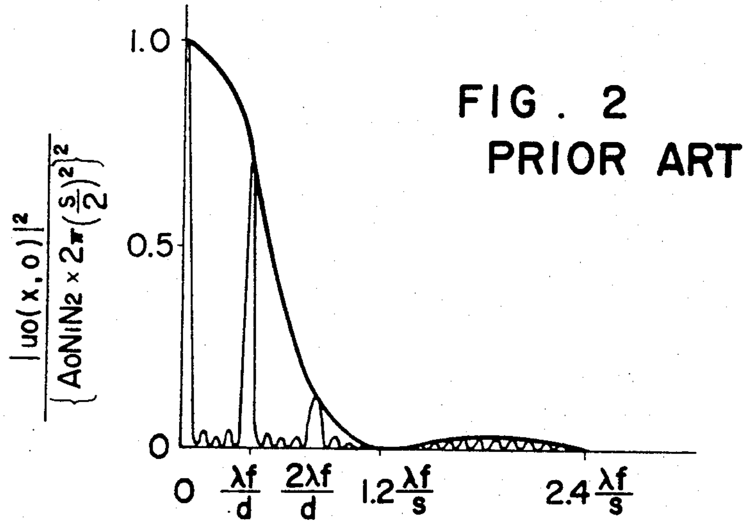
FIG. 3
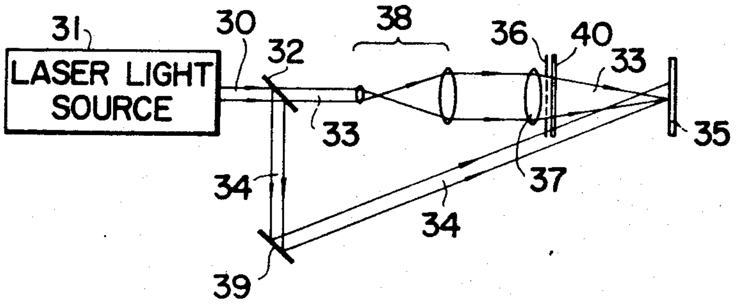
INVENTORS
YASUTSUGU TAKEDA
AND YOSHITADA OSHIDA
BY Craig, Antonelli, Stewart & Hill
ATTORNEYS

PATENTED JUL 10 1973

3,744,871

SHEET 2 OF 4

INVENTORS
YASUTSUGU TAKEDA
BY AND YOSHITADA OSHIDA

Craig, Antonelli, Stewart + Hill
ATTORNEYS

INVENTORS
YASUTSUGU TAKEDA
AND YOSHITADA OSHIDA
BY
Craig, Antonelli, Stewart & Hill
ATTORNEYS INVENTORS
YASUTSUGU TAKEDA
AND YOSHITADA OSHIDA
BY Craig, Antonelli, Stewart & Hill
ATTORNEYS

HOLOGRAPHIC MEMORY SYSTEM FOR RECORDING DIGITAL INFORMATION

BACKGROUND OF THE INVENTION

1. Field of the Invention

The invention relates to a high packing density digital memory system, and in particular to a memory system utilizing a holographic process to record Fourier transforms.

2. Description of the Prior Art

In many modern applications of the information memory a digital information is represented by a combination of a group of binary "bits." As is well known in the art, in digital information records using the binary system, the absence or presence of a small spot, e.g., on a card indicates "0" or "1" for each numeral digit. With digital computers getting larger and demanding greater information memory capacity, there has arisen a need for an information recording medium which takes a minimum amount of space.

A first type of prior art high density recording process, using a laser or electron beam to provide a recording of small information bits spaced closely together on a photographic film, has involved the recording of digital information by means of either "white" dots on a "black" background, or "black" dots on a "white" background. An exceedingly high digital packing density has been obtained by these processes with extremely fine grained films. The systems can be reliable, and high output levels may be achieved, if the dynamic range of the film is entirely utilized. However, since each bit represents one portion of information, small imperfections, or minor damage to the recording, e.g., damage to the emulsion, particles of dust that may settle on the film, scratches that are generated by film handling, etc. may obliterate a large amount of the information.

In order to alleviate such problems by providing for some form of redundancy, a second type of high density recording process has been proposed. The system utilizes holograms which contain a plurality of information bits. A light modulator capable of temporarily storing a representation of a plurality of bits is impinged by a coherent light beam. Generally, a laser illuminates the stored bits, which in turn, provides an amplitude or phase-modulated pattern of the laser light. A transform lens is placed to intercept the resulting "object" beam and to convert the amplitude or phase-modulated pattern into a Fourier transform. Simultaneously, a "reference" beam extracted from preferably the same laser light by using a beam splitter, is diverted around the light modulator and the transform lens, and is directed to the recording medium, such as a photographic film arranged along the Fourier transform. The recording of a complex light interference pattern on the film is effected by superimposing the object and reference beams. Redundancy is achieved by selecting the size of the Fourier transform of a single bit in the recording, and the packing density is defined by the number of bit transforms superimposed on this same area; while, in the first type digital recording method, the packing density is defined by the size of the bits and their closeness.

Within the transform area all light waves diffracted by information bits interfere in the recording plane, so as to produce a pattern having a more and more concentrated intensity distribution, as the space between bits decreases. When a circular bit is used, the full Fourier transform to be recorded is a complete set of concentric rings, which are termed Airy discs. These rings extend to infinity with diminishing amplitude. When the intensity distribution is concentrated, the diameter of these rings doesn't decrease, but increases by an amount inversely proportional to the distance between the center of the bits with increasing amplitude. In other words, the concentration in the intensity distribution takes place by superimposing in less and less locations. If the intensity distribution is too strongly concentrated, some peaks in the intensity distribution may exceed the dynamic range of photographic film. The farther the information bits are separated, the less pronounced is the intensity distribution in the transform. Therefore, to obtain good redundancy, a compromise must be made between the redundancy and the effective packing density of information, by spacing the information bits relatively far apart.

This localization of the energy of diffracted light waves can be reduced by placing the recording medium a small distance away from the focal point of the Fourier transform lens. This is a very useful method for decreasing the maximum value of the intensity distribution. However, in this case, as can be easily shown, not only the localization of the energy is attenuated, but also the energy is spread in a circle of a larger diameter. It is, therefore, impossible to obtain a high packing density by this method. Moreover, there is another disadvantage by this method. If the recording medium were placed at the focal point of the Fourier transform lens, the contribution of one information bit to a hologram would be almost uniform over the hologram plane. In case the recording medium is displaced from the focal point of the Fourier transform lens, the uniformity is more or less damaged and this lowers the quality of reconstructed images.

SUMMARY OF THE INVENTION

An object of the invention is, therefore, to provide a Fourier transform holographic memory system for recording digital information bits with an increased packing density by smoothing sharp variations in the intensity distribution on the recording plane due to the interference between light waves, each of which is emitted by one of the information bits.

Another object of the invention is to provide a random phase shifter, which can be used for smoothing said sharp variations in the intensity distribution on the recording plane in a Fourier transform holographic memory system.

In order to achieve the first object, in accordance with the invention, the smoothing of said sharp variation in the intensity distribution on the recording plane is effected by using a random phase shifter consisting of a plurality of elements arranged in matrix form and having at least two different optical path lengths distributed at random, which is placed in such a way that each element corresponds to one of the information bits arranged on the light modulator in the same way as the random phase shifter, in order that light waves corresponding to different information bits are subjected to at least two different phase shifts distributed at random.

The object of the invention can be achieved also by a Fourier transform holographic recording system, whereby the smoothing of said sharp variations in the intensity distribution on the recording plane is effected by using an illumination hologram by which a plurality of light waves corresponding to different information bits with at least two different phases can be reconstructed.

The second object of the invention is achieved either by a random phase shifter, which is a plate consisting of a plurality of elements arranged in matrix, which are of at least two different densities of a material having a low absorption coefficient, or by a random phase shifter, which is a plate made of a material having a low absorption coefficient, consisting of a plurality of elements arranged in matrix, which are of at least two different thicknesses.

The foregoing objects, features and advantages of the invention will be apparent from the following more particular description of preferred embodiments in conjunction with the accompanying drawing.

BRIEF DESCRIPTION OF THE DRAWING

FIG. 1 is a schematic diagram representing a prior art holographic memory system;

FIG. 2 represents the intensity distribution of diffracted light waves by a punched card provided with circular holes arranged in matrix form in the neighborhood of the focal point of a Fourier transform lens in the prior art holographic memory system;

FIG. 3 is a schematic diagram representing a holographic memory system according to the invention;

DESCRIPTION OF THE PREFERRED EMBODIMENTS

Example 1

Figures 4, 6:
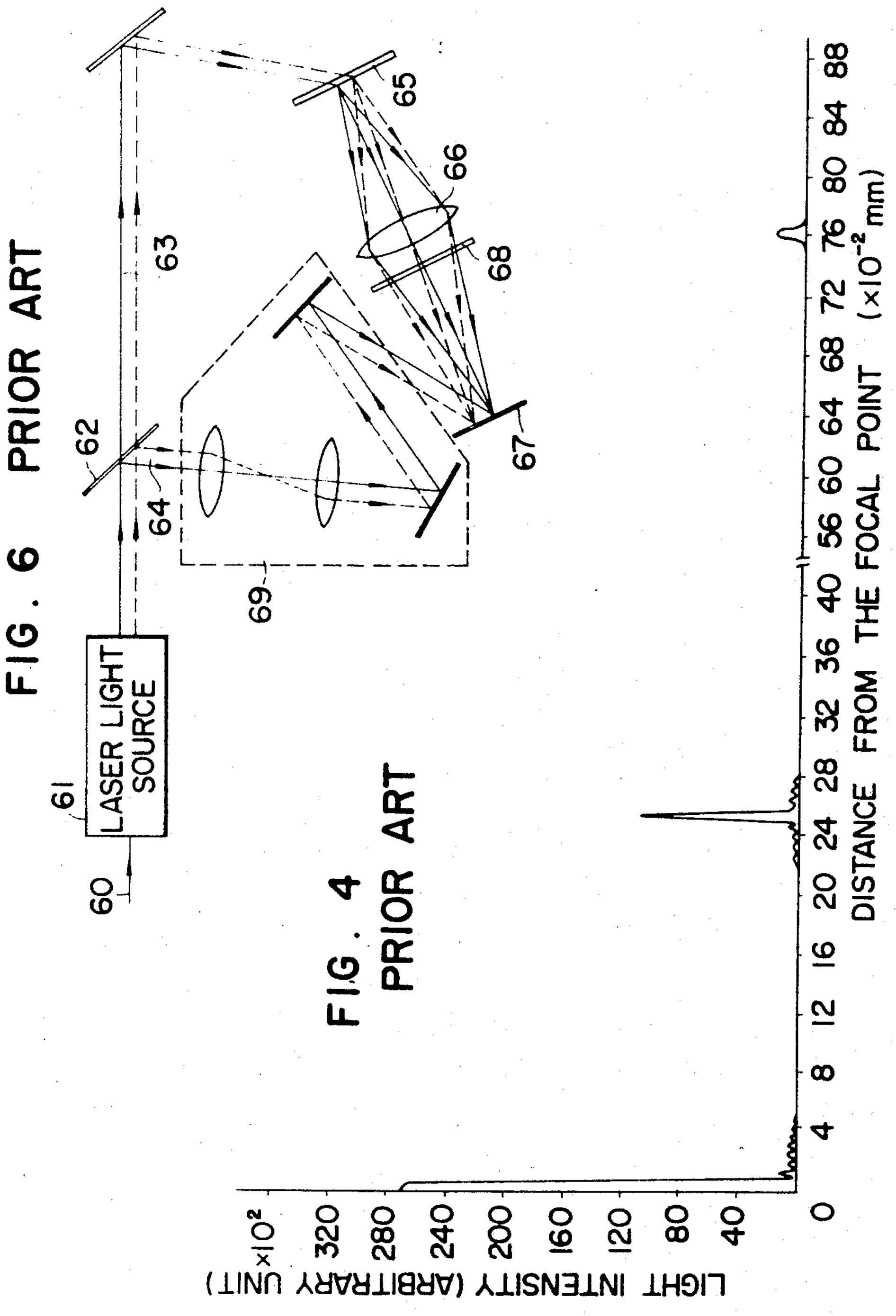
FIG. 6 PRIOR ART, FIG. 4 PRIOR ART
FIG. 4 is an example of the intensity distribution of diffracted light waves obtained by a prior art holographic memory system.
FIG. 6 is a schematic diagram representing a prior art holographic memory system using an illumination hologram.

The invention is concerned with the high packing density holographic memory system for recording digital informations in the form of Fourier transforms utilizing random phase shifter means, which makes it possible to smooth sharp variations in the light intensity distribution on the recording medium due to the interference between light waves corresponding to different information bits, and thus to increase light energy on the recording medium within its dynamic range. By way of explanation, the effects of the random phase shifter means on the interference pattern between light waves representing different information bits can be easily understood by considering the interference between light waves passing through circular holes.

Referring to FIG. 1, a coherent parallel light beam 10 emitted by a laser light source 11 is divided into two light beams, a transmitted light beam called an "object" light beam 13 and a reflected light beam called a "reference" light beam 14, by means of a beam splitter 12 consisting usually of a half-mirror. The former 13 is expanded by means of a beam expander 18 consisting usually of two convex lenses, as indicated in the figure, which transforms a narrow parallel light beam into a broad parallel one. A Fourier transform lens 17 receives the broad parallel light beam and focuses it on a recording medium 15, such as a photographic film. A light modulator 16 disposed so as to intercept the object light beam, which may be a punched card having a plurality of holes or opto-electronic means arranged in matrix array, gives digital information bits to said focused "object" light beam 13. The latter beam 14 is diverted around said beam expander 18, said Fourier transform lens 17 and said light modulator 16, and is directed to said recording medium 15 by means of an optical system 19, such as a plane mirror, so as to form an interference pattern representing amplitude and phase information together with said "object" light beam 13. The light modulator 16 can be placed also before the Fourier transform lens 17.

Suppose now that said light modulator 16 is a punched card having circular holes of a diameter $s$ arranged in a matrix of $N_1$ rows and $N_2$ columns, that the distance between adjacent hole centers is $d (d>s)$ both in the rows and in the columns, and that the origin of a cartesian coordinate $(\zeta, \eta)$, the two axes of which are parallel with respect to the rows and to the columns of the matrix, respectively, is placed at the center of the matrix. The circular holes completely transmit light which they receive and the other part of the card perfectly interrupts light on it. Namely, the transmission of light for a circular hole at the center of the matrix can be represented by the following transmission function:

$$t_0(\zeta, \eta) = \begin{cases} 1: \sqrt{\zeta^2+\eta^2} \leq \frac{s}{2} \\ 0: \sqrt{\zeta^2+\eta^2} > \frac{s}{2} \end{cases} \quad (1)$$

For all $N_1 \times N_2$ circular holes the transmission function $t(\zeta, \eta)$ can be expressed as follo s:

$$t(\zeta, \eta) = \sum_{n_1=-\frac{N_1}{2}}^{\frac{N_1}{2}} \sum_{n_2=-\frac{N_2}{2}}^{\frac{N_2}{2}} t_0(\zeta - n_1 d, \eta - n_2 d) \quad (2)$$

When light waves diffracted by the circular holes in the above mentioned light modulator are focused on the recording medium by means of a Fourier transform lens having a focal length $f$, the amplitude distribution of diffracted light waves at the neighborhood of the focal point can be represented by the following formula:

$$u_0(x, y) = C_1 A_0 \sum_{n_1=-\frac{N_1}{2}}^{\frac{N_1}{2}} \sum_{n_2=-\frac{N_2}{2}}^{\frac{N_2}{2}} \iint t_0(\zeta - n_1 d, \eta - n_2 d) \times \exp.\left\{-ik\left(\frac{\zeta x}{f} + \frac{\eta y}{f}\right)\right\} d\zeta d\eta, \quad (3)$$

where $i$ is the positive square root of $-1$, $x$ and $y$ are cartesian coordinates on the recording medium which correspond to $\zeta$ and $\eta$ on the light modulator respectively, $k$ is the wave number of the laser light, $C_1$ is equal to exp $(-i\ kf)$, and $A_O$ is the product of the amplitude of the object light beam received by the light modulator to a factor $(-ik/\ 2\pi f)$.

The intensity distribution of the diffracted light waves at the neighborhood of the focal point can be obtained as follows, by carrying out the integration in the formula (3), writing $r$ for $\sqrt{x^2+y^2}$, and squaring the amplitude $u_O\ (x,\ y)$:

$$|u_0(x,\ y)|^2=|A_0|^2\left\{2\pi\left(\frac{s}{2}\right)^2\right\}^2 \times \frac{J_1^2\left(\frac{ksr}{2f}\right)}{\left(\frac{ksr}{2f}\right)^2}\ \frac{\sin^2\frac{N_1kdx}{2f}}{\sin^2\frac{kdx}{2f}}\ \frac{\sin^2\frac{N_2kdy}{2f}}{\sin^2\frac{kdy}{2f}} \tag{4}$$

FIG. 2 shows the intensity distribution of the diffracted light waves in the neighborhood of the focal point of the Fourier transform lens for a light beam having a wave length of about $0.6\mu$ emitted by a He-Ne laser light source, $f=200$ mm, $s=0.2$ mm, $d=0.5$ mm, and $N_1=N_2=61$. The abscissa represents the distance measured along the x-axis from the origin which is the focal point of the Fourier transform lens, and the ordinate represents the intensity of the diffracted light wave in unit of $$|u_o\ (x,\ o)\ |^2\ /\ \left\{A_oN_1N_2\times 2\pi\ (s/2)^2\right\}^2$$

The amplitude of the object light beam should be much smaller than that of the reference light beam, in order that a hologram obtained by superposing the object and reference light beams can record and reconstruct the information with a high fidelity. As can be seen easily in FIG. 2, in the prior art holographic memory system the energy of light is concentrated in a small region in consequence of the mutual interference of the light waves diffracted by a plurality of holes, and therefore, the amplitude of the object light beam must be maintained at a very low level for a given energy of the reference light beam. Since from the formula (4)

$$|\ u_o\ (x,\ y)\ |_{max}=A_o\ 2\pi\ (s/2)^2\ N_1N_2 \tag{5}$$

the greater the number of information bits, the weaker is the object light beam which can be utilized. In the case where a photographic film is used as a recording medium, if the object light beam is so weak that the maximum value of the intensity distribution is in the dynamic range of the photographic film, low intensity parts of the interference pattern, as indicated in FIG. 2, are in its insensitive range. If the object light beam is too strong, the maximum value of the intensity distribution exceeds the dynamic range of the photographic film. Thus, reconstructed images cannot be of high quality in both cases, and the packing density according to the prior art holographic memory system has been practically limited to about $10^3$ bits / mm$^2$.

In the schematic diagram of the holographic memory system according to the invention shown in FIG. 3 the designated numerals 30 to 39 correspond to elements 10 to 19 shown in FIG. 1, respectively, and the numeral 40 represents a random phase shifter according to the invention. Suppose that the phase of the object light beam passing through the circular hole $(n_1,\ n_2)$ $(-N_1/2 < n_1 < N_1/2,\ -N_2/2 < n_2 < -N_2/2)$ in the matrix on the light modulator is shifted by $\theta'_{n_1,n_2}$ $(0<\theta'_{n_1,n_2}<2\pi)$, then the amplitude distribution of diffracted light waves in the neighborhood of the focal point is given by the following formula instead of formula (3):

$$u_0(x,y=C_1A_0\sum_{n_1=-\frac{N_1}{2}}^{\frac{N_1}{2}}\ \sum_{n_2=-\frac{N_2}{2}}^{\frac{N_2}{2}}\int\int t_0(\zeta-n_1d,\eta-n_2d) \times \exp\left\{-\zeta\theta^1_{n_1,n_2}-ik\left(\frac{\zeta x}{f}+\frac{\eta y}{f}\right)\right\}d\zeta d\eta \tag{6}$$

Putting $$\begin{aligned}\zeta^1&=\zeta-n_1d\\ \eta^1&=\eta-n_2d\\ \theta_{n_1,n_2}&=\theta^1_{n_1,n_2}+\frac{n_1dx}{f}+\frac{n_2dy}{f}\end{aligned} \tag{7}$$

$\theta_{n_1,n_2}$ being also a quantity representing a random phase, the formula (6) can be transformed to:

$$u_0(x,\ y)=C_1A_0\int\int t_0(\zeta^1,\ \eta^1)\,e^{-ik\left(\frac{\zeta^1x}{f}+\frac{\eta^1y}{f}\right)}d\zeta^1d\eta^1 \times \sum_{n_1=-\frac{N_1}{2}}^{\frac{N_1}{2}}\ \sum_{n_2=-\frac{N_2}{2}}^{\frac{N_2}{2}} e^{-i\theta_{n_1,n_2}} \tag{8}$$

The following relation is valid, if $\theta_{n_1,n_2}$ is distributed at random, and $N_1$ and $N_2$ are great.

$$\sum_{n_1=-\frac{N_1}{2}}^{\frac{N_1}{2}}\ \sum_{n_2=-\frac{N_2}{2}}^{\frac{N_2}{2}} e^{i\theta\theta_{n_1,n_2}}\doteqdot\sqrt{N_1N_2} \tag{9}$$

Thus, the maximum value of the amplitude is given by $$|U_O\ (x,\ y)\ |_{max}=A_O\ 2\pi\ (S/2)^2\ \sqrt{N_1N_2} \tag{10}$$

instead of formula (5).

The packing density of information bits on the recording medium can be increased by using the random phase shifter with respect to those obtained by the prior art holographic memory system under the same conditions except for the absence of the random phase shifter, due to the fact that the factor $N_1\times N_2$ in the formula (5) is replaced by the factor $\sqrt{N_1\times N_2}$ in the formula (10), that is, if the packing density is limited to $10^3$ bits/ mm$^2$ by the prior art holographic memory system, it is increased to $10^6$ bits/mm$^2$ by the system according to the invention.

The random phase shifter utilized in the holographic memory system according to the invention can be prepared either by a multiple exposure method or by a multiple evaporation method, as described hereafter.

1. Multiple exposure method $\theta\ (i,\ j)$ is determined to one of the values of $0,\ 2\pi\ /\ n,\ 2\pi\cdot 2/n,\ \ldots,\ 2\pi^{\cdot(n-1)}\ /n$ at random. This is done by using a table of random numbers or random numbers produced by an electronic computer. A photographic plate containing the above-mentioned $n$ groups of matrix elements is exposed $m$ times ($n>m$) with appropriate masks, so that the exposure dose for each matrix element is proportional to $\theta\ (i, j)$ and so that the highest exposure dose does not exceed the dynamic range of the photograhpic plate. After being developed and fixed, the photographic plate is transformed by a bleaching technique into a random phase shifter having the optical properties needed by the holographic memory system according to the invention. Namely, the photographic plate is exposed, developed, and fixed, so that a distribution of blackening proportional to $\theta\ (i, j)$ due to educed silver is obtained, just as by ordinary photographic techniques. Then the photographic plate is treated with a potassium ferricyanide, chromiumintensifier of KODAC, or a mercuric chloride solution, so that the educed silver is converted into $Ag_4Fe(CN)_6$, $AgCl + Cr_2Cl_3$, or $AgCl + HgCl$, respectively, which has a low absorption coefficient and a high index of refraction.

A random phase shifter prepared by this method can be made also by means of a thin gelatin layer impregnated with ammonium dichromate or of a light sensitive resin layer. Hexavalent chromium ions in ammonium dichromate are transformed by light into trivalent ions, which, being combined with NH—CO— and other radicals in gelatin, reduce the hydrophilic property of protein and harden the gelatin layer. By treating this gelatin layer with water, differences in swelling are provoked at differently exposed parts of the layer. By rapid dehydration (drying after impregnating with alcohol) these differences of swelling can be converted into the differences in thickness and in density of the gelatin layer, so that the phase shift of light waves passing through different points of the random phase shifter thus obtained varies proportionally to the exposure dose.

2. Multiple evaporation method $m$ ($n > m$) masks are prepared, in order to get $n$ steps of phase shift ( $0, 2\pi/n, 2\pi\cdot 2/n, \ldots 2\pi^{\cdot(n-1)}/n$), just as by the multiple exposure method. A layer of a transparent material having a thickness determined by the following formula is deposited through one of the masks on an optically polished glass plate:

$$t = \lambda/n\ (\epsilon - 1) \tag{11}$$

where $\lambda$ is the wave length of the utilized laser light, and $\epsilon$ is the index of refraction of the utilized transparent material. For instance, $t = 4800$ A for $\lambda = 0.6\mu$, $n = 10$, and $\epsilon = 2.3$ (ZnS). A random phase shifter having the optical properties needed for the holographic memory system according to the invention can be obtained by repeating m times the above-mentioned process with different masks.

It is also possible to make random phase shifter means incorporated in a light modulator. In this case a combination of an opto-electronic crystal, such as a crystal of potassium dihydrogen phosphate and a polarizer, is most suitably utilized as matrix element of the light modulator. The layer of the transparent material is deposited directly either on an optically polished crystal surface or on a surface of the polarizer by the multiple evaporation method.

In order to show more clearly the advantages of the invention with respect to the prior art holographic memory system, an intensity distribution of light waves diffracted by one column of circular holes with and without the random phase shifter according to the invention are compared. FIG. 4 represents the intensity distribution of diffracted light waves on the recording medium 15 placed at the focal point of the Fourier transform lens 17 without the random phase shifter, in the case where the focal length f of the Fourier transform lens 17 is 200 mm; the diameter of the holes $s$ in the light modulator 16 is $250\mu$; the distance between adjacent hole centers is $500\mu$; and the number of holes is 41. The maximum value of the light intensity is $2.6 \times 10^4$ times as great as that received by the light modulator. As is seen in FIG. 4, the intensity distribution of diffracted light waves without the random phase shifter forms a sharply varying spectrum and the energy containing the information is strongly localized. As mentioned already, this is a very unfavorable situation to be recorded on a photographic plate. Almost all light energy on the recording medium is concentrated within a circle of a radius of 0.3 mm. Hereinafter, this radius, within a circle of which almost all light energy is concentrated, will be denoted as $r_0$. However, the radius $r_0$ should be as small as possible in order to obtain a high packing density. As mentioned above, the localization of the energy of diffracted light waves can be reduced by placing the recording medium a small distance away from the focal point of the Fourier transform lens. When the distance between the recording medium and the focal point of the Fourier transform lens is 2 percent of the focal length of the lens, the abovementioned maximum value of the light intensity with respect to that received by the light modulator is reduced to $8.7 \times 10^2$ times under the same conditions except for the position of the recording medium, but $r_0$ is increased to 0.65 mm, which, of course, decreases the packing density.

Figure 5:
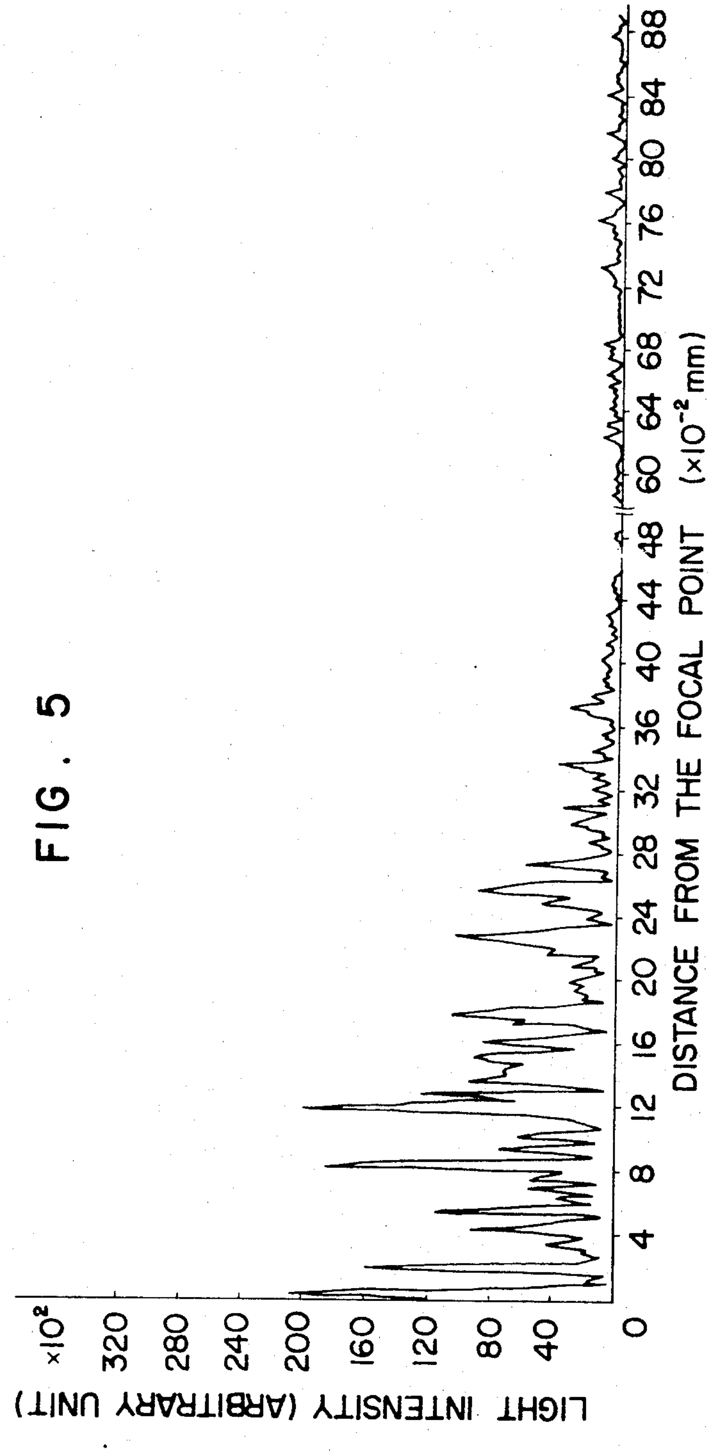
FIG. 5 is an intensity distribution of diffracted light waves obtained by a holographic memory system according to the invention.

FIG. 5 represents the intensity distribution of diffracted light waves under the same conditions as those described for FIG. 4 except for the presence of a random phase shifter of 5 steps 40 in FIG. 3. The maximum value of the light intensity is $2.2 \times 10^3$ times as great as that received by the light modulator, that is, it is reduced by more than one order of magnitude with respect to that obtained without the random phase shifter. As is seen in FIG. 5, the localization of light energy is significantly reduced with a small increase of $r_0$. The value of $r_0$ is increased to about 0.35 mm.

Table 1 shows the maximum value of light intensity and $r_0$ for various numbers of steps. A random phase shifter of a number of steps greater than or equal to 2 has some effects on the intensity distribution of diffracted light waves. However, according to the experimental results shown in Table 1, the number of steps should be preferably not less than 4. Moreover, in the case of 2 steps, if the distribution of information concides by chance with that of the random phase shifter, it will have no effect on the intensity distribution. With a greater number of steps the former cannot coincide with the latter. In the last line of the table, where the number of steps is equal to 1, the results obtained without the random phase shifter are shown.

TABLE 1

| Number of Steps | Maximum Value of Light Intensity (relative) | $r_0$ (mm) |
|---|---|---|
| 9 | $2.0 \times 10^3$ | 0.35 |
| 5 | $2.2 \times 10^3$ | 0.35 |
| 2 | $3.1 \times 10^3$ | 0.35 |
| 1 | $2.6 \times 10^4$ | 0.30 |

Since the random phase shifter is made by a chemical process, it is inevitable that intervals in phase shift deviate from those of equally divided phase shifts. Table 2 shows the maximum value of light intensity and $r_0$ for a deviation of 33 percent from the equally divided phase shifts. Comparing the results shown in Table 2 with those shown in Table 1, the maximum value of light intensity for 9 steps is twice as great as that described in Table 1, while for 2 steps it is 2.5 times as great as the latter. The tolerance has a tendency to increase with an increasing number of steps. It is also from this point of view that the number of steps is preferably not less than 4.

TABLE 2

| Number of Steps | Maximum Value of Light intensity (relative) | $r_0$ (mm) |
|---|---|---|
| 9 | $4.1 \times 10^3$ | 0.35 |
| 2 | $7.5 \times 10^3$ | 0.35 |

In the above-mentioned embodiment, one phase shift is determined for one information bit. However, in the case where one light modulator should contain a very large number of information bits, it is also possible to choose one phase shift for a plurality of information bits. For instance, a random phase shifter consisting of elements arranged in a matrix of 10 rows and 10 columns can be utilized for a light modulator consisting of elements arranged in a matrix of 100 rows and 100 columns.

Example 2

Another method for carrying out the invention is to utilize as a random phase shifter an illumination hologram such as described in the article entitled "The Promise of Dense Data Storage" published in Electronic Design, Vol. 17, No. 11, p. 59 (May, 1969). FIG. 6 represents a prior art holographic memory system by means of which an illumination hologram makes it possible to record a plurality of holograms on one recording medium without deplacing either lens system or recording medium. Referring to FIG. 6, a coherent parallel light beam 60 emitted by a laser light source (not shown) is received by electrically controlled light deflecting means 61 which govern the passage of light, so that a hologram is obtained at a desired position on a recording medium 67. The deflected light beam is divided into two light beams, an "object" light beam 63 and a "reference" light beam 64, by means of a beam splitter 62, just as in Example 1. The former beam 63 is directed to an illumination hologram 65 made of a high diffraction efficiency material such as dichromated gelatin by using optical means, such as a plane mirror. The light beam received by the illumination hologram 65 is diffracted toward a Fourier transform lens 66, which focuses received diffracted waves on the recording medium 67. A light modulator 68 containing information bits arranged in matrix form just as described in Example 1 is disposed between said Fourier transform lens 66 and said recording medium 67. The reference light beam 64 is transmitted to the recording medium 67 by using optical means 69 containing a light passage inverter as indicated in the figure.

In the prior art holographic system of FIG. 6 using an illumination hologram, light beams impinging on the illumination hologram are subjected to a uniform phase shift. Therefore, the intensity distribution of diffracted light waves by a light modulator consisting of information bits arranged in matrix is strongly localized, so that the maximum value may exceed the dynamic range of the recording medium. The light waves diffracted by an illumination hologram according to the invention (hereinafter called a random phase illumination hologram) are so affected that the light waves have different phases at the position of different information bits on the light modulator and that the above-mentioned phases are distributed at random so as to smooth sharp variations in the light intensity distribution on the recording medium due to the interference between light waves corresponding to different bits. The effect of the random phase illumination hologram is, therefore, exactly the same as that of the random phase shifter in Example 1.

Figure 7:
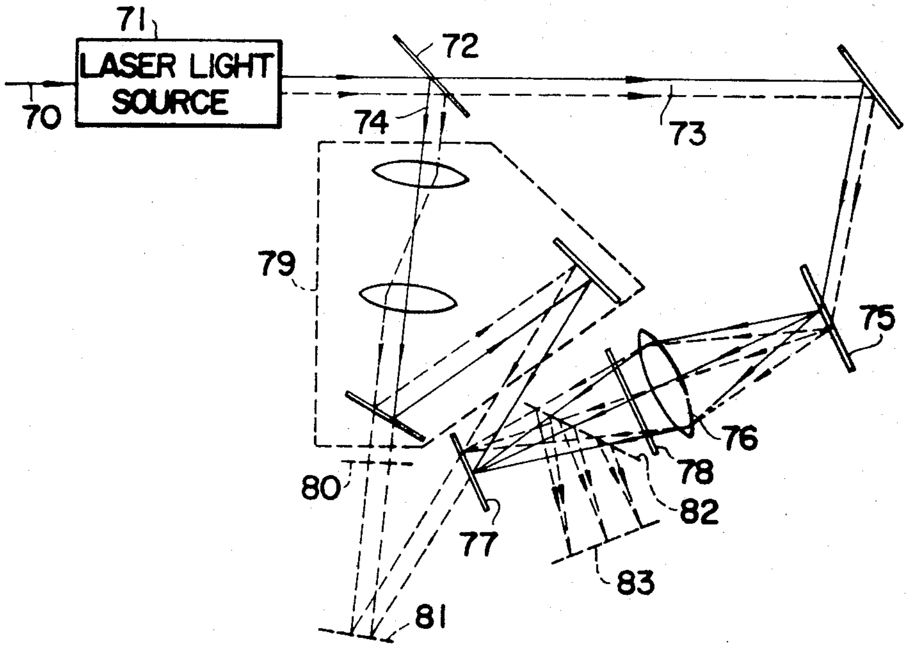
FIG. 7 is a schematic diagram representing a holographic memory system using an illumination hologram according to the invention.

FIG. 7 indicates a schematic diagram of a holographic memory system using a random phase illumination hologram. The numbers from 70 to 79 are identical with those from 60 to 69 indicated in FIG. 6, respectively, except that an ordinary illumination hologram 65 of FIG. 6 is replaced by a random phase illumination hologram 75 in FIG. 7. The numbers from 80 to 83 represent devices for the reconstruction of stored information bits. A shutter 80 is closed during the formation of holograms and open during the reconstruction of stored information bits. A plane mirror 81 reflects the reference light beam so that the recording medium 77 is illuminated exactly in the inverse direction with respect to that of the reference beam for the formation of holograms. 82 is a half-mirror used for the reconstruction of stored information bits, which forms a reconstructed image on a photosensor array 83.

Figure 8:
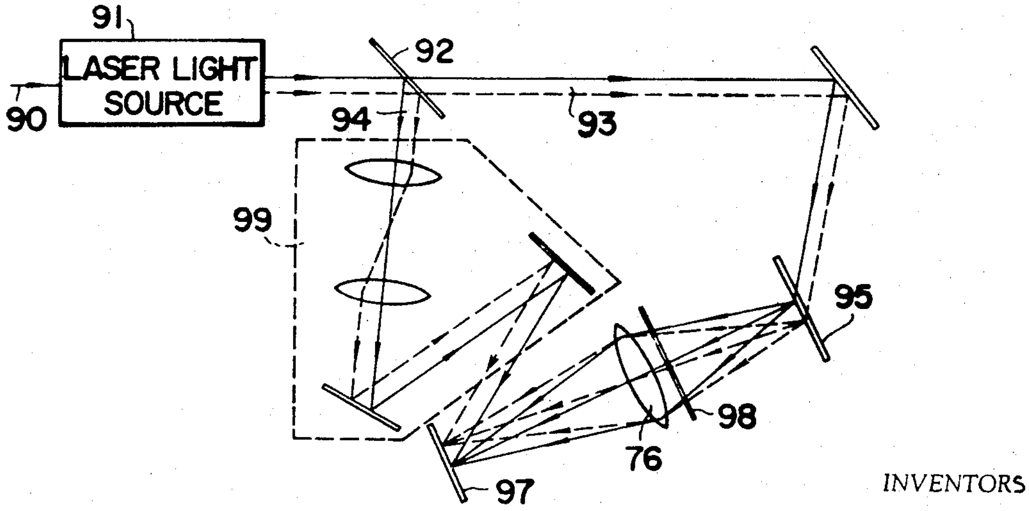
FIG. 8 is a schematic diagram representing an apparatus for producing an illumination hologram utilizable in a holographic memory sytem in accordance with the invention.

A random phase illumination hologram, wbich can be utilized by this method, can be made by utilizing an arrangement shown in FIG. 8, in which the elements 90, 91, 92, 93, 94, 97 and 99 are exactly identical with elements 70, 71, 72, 73, 74, 77 and 79 indicated in FIG. 7 respectively. The random phase illumination hologram 75 and the light modulator 78 in FIG. 7 are replaced by an ordinary illumination hologram 95 and a random phase shifter 98 in accordance with the invention, respectively, so that the relative geometry of the ordinary illumination hologram 95, the random phase shifter 98, a Fourier transform lens 96 which is completely identical with the Fourier transform lens 76 shown in FIG. 7, and a recording medium 97 is exactly identical with that of the recording medium 77, the light modulator 78, the Fourier transform lens 76, and the random phase illumination hologram 75, and that the recording medium 97 is illuminated by the reference light beam 94 in the opposite direction with respect to the direction of the object beam 73 when it is placed at 75 as a random phase illumination hologram.

Further, in the process of fabricating a random phase illumination hologram, the random phase shifter can be combined with a shadow mask, which is transparent only at the same place as the utilized light modulator. A random phase illumination hologram thus obtained localizes light energy on the light modulator more effectively than that obtained without shadow mask.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A Fourier transform holographic memory apparatus comprising:

a source of coherent light;

first means for receiving the coherent light produced by said source and for controllably deflecting said coherent light;

second means, receiving the light controllably deflected by said first means, for splitting said light into a reference beam and an object beam, respectively, along different optical paths;

a random phase illumination hologram disposed in the path of said object beam for producing, from said object beam, an array of beams travelling along a plurality of discrete and separate paths from each respective location on said hologram, the phase of each beam being substantially constant across the beam and being randomly shifted with respect to the phases of the other beams so as to function both as an illumination hologram and as a random phase shifter;

a Fourier transform lens disposed in the path of said arrays of beams through which said beams pass;

third means, disposed in the path of the arrays of beams passing through said lens, for modulating said beams in accordance with information supplied thereto; and fourth means, disposed in the path of said reference beam and said object bean, for recording the image formed by the impingement of said reference beam and said modulated arrays of beams thereon.

* * * * *